United States Patent [19]
Viot et al.

[11] Patent Number: 5,748,490
[45] Date of Patent: May 5, 1998

[54] LOW POWER LOGIC MINIMIZATION FOR ELECTRICAL CIRCUITS

[75] Inventors: J. Greg Viot; Oded Yishay, both of Austin, Tex.

[73] Assignee: Motorola, Inc., Schaumburg, Ill.

[21] Appl. No.: 548,929

[22] Filed: Oct. 26, 1995

[51] Int. Cl.$^6$ .................................................. G06F 17/50
[52] U.S. Cl. ................................................ 364/489
[58] Field of Search ............................... 364/488, 489, 364/490, 491

[56] References Cited

U.S. PATENT DOCUMENTS

| | | | |
|---|---|---|---|
| 5,434,794 | 7/1995 | Coudert et al. | 364/489 |
| 5,452,215 | 9/1995 | Washabaugh | 364/468 |
| 5,502,648 | 3/1996 | Kaplan | 364/490 |

OTHER PUBLICATIONS

Charles H. Roth, Jr., "Fundamentals Of Logic Design", Section 6.1 Minimum Forms of Switching Functions, Published in 1992 by West Publishing Co., pp. 116–131.

Charles H. Roth, Jr., "Fundamentals Of Logic Design", Section 7.1 Determination of Prime Implicants, Published in 1992 by West Publishing Co., pp. 155–161.

Ashar et al., "Optimium & Huristic Algorithms for an Approach to Finite State Machine Decomposition," IEEE Trans. on CAD, vol. 10, No. 3, Mar. 1991, pp. 296–310.

Benini et al., "State Assignment for Low Power Dissipation," IEEE J. of Solid State Circuits, vol. 30, No. 3, Mar. 1995, pp. 258–268.

Devadas et al., "Exact Algorithms for Output Encoding, State Assignment, and Four–Level Boolean Minimization," IEEE Trans. on CAD, vol. 10, No. 1, Jan '91, pp. 13–27.

Helstrom, *Probability and Stochastic Processes for Engineers*, 1991, pp. 35–39, Macmillan Publishing Company.

Iman et al., "Two–Level Logic Minimization for Low Power," ICCAD '95, pp. 433–438.

Perkowski et al., "KUAI–EXACT: A New Approach for Multi–Valued Logic Minimization in VLSI Synthesis," ISCAS '89, pp. 401–404.

Roy et al., "SYCLOP: Synthesis of CMOS Logic for Low Power Applications," ICCD '92, pp. 464–467.

Tsui et al., "Power Estimation Methods for Sequential Logic Circuits," IEEE Trans. on VLSI Systems, vol. 3, No. 3, Sep. 1995, pp. 404–416.

Yang et al., "Estimating Power Dissipation in VLSI Circuits," Circuits and Devices, Jul. 1994, pp. 11–19.

*Primary Examiner*—Kevin J. Teska
*Assistant Examiner*—Leigh Marie Garbowski
*Attorney, Agent, or Firm*—Susan C. Hill

[57] ABSTRACT

A process (601–611) and implementing computer system (13) for selecting a specific logic circuit among a group of otherwise acceptable alternative circuits, as represented by prime implicant terms (607), includes determining and assigning a power consumption factor (609) to each of the alternative logic circuit implementations. In the disclosed example, the probability of switching logic states (313, 513) is determined and used as a measure of the power consumption factor associated with each of the acceptable and valid prime implicant solutions for a given logic function. From a group of acceptable prime implicant solutions, the power optimum solution is chosen (611) which has been determined to be the most likely to consume the least amount of power in implementing the desired logic function.

15 Claims, 4 Drawing Sheets

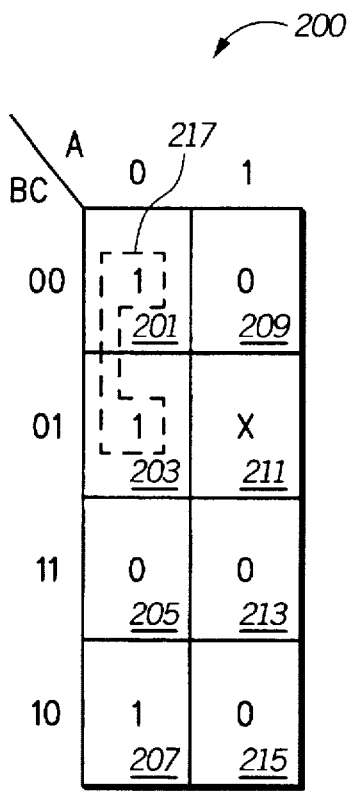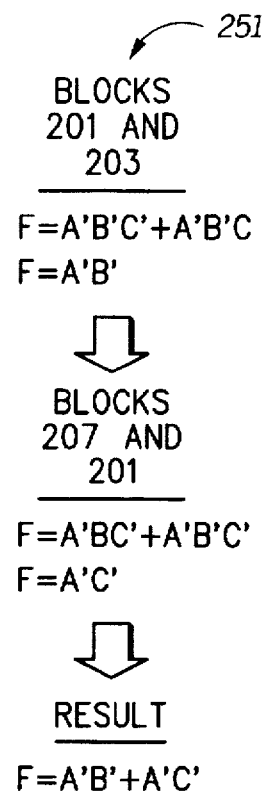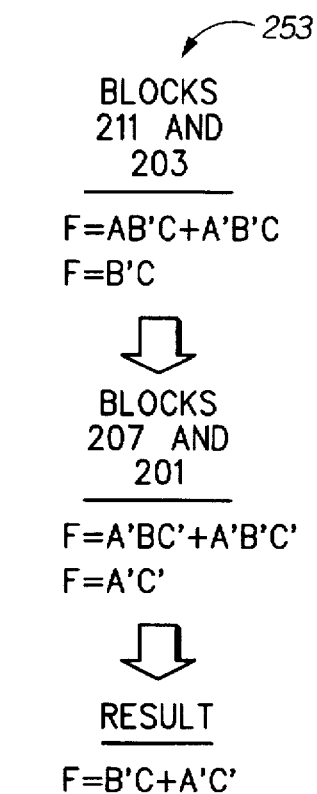
FIG.2A    FIG.2B    FIG.2C
FIG.4

FIG.3

| LOGIC TERMS CONSIDERED | 301 HIGH H | 303 LOW L | 305 PROBABILITY OF HIGH P(H) | 307 PROBABILITY OF LOW P(L) | 309 PROBABILITY OF SWITCHING HIGH TO LOW PS(H-L) | 311 PROBABILITY OF SWITCHING LOW TO HIGH PS(L-H) | 313 TOTAL PROBABILITY OF SWITCHING PS |
|---|---|---|---|---|---|---|---|
| A'C' | 2 | 5 | 2/7 | 5/7 | 10/49 | 10/49 | 20/49 |
| A'B' | 2 | 5 | 2/7 | 5/7 | 10/49 | 10/49 | 20/49 |
| B'C | 1 | 6 | 1/7 | 6/7 | 6/49 | 6/49 | 12/49 |

FIG.5

| LOGIC TERMS CONSIDERED | 501 HIGH H | 503 LOW L | 505 PROBABILITY OF HIGH P(H) | 507 PROBABILITY OF LOW P(L) | 509 PROBABILITY OF SWITCHING HIGH TO LOW PS(H-L) | 511 PROBABILITY OF SWITCHING LOW TO HIGH PS(L-H) | 513 TOTAL PROBABILITY OF SWITCHING PS |
|---|---|---|---|---|---|---|---|
| A'C' | 2 | 5 | .3 | .7 | .21 | .21 | .42 |
| A'B' | 2 | 5 | .3 | .7 | .21 | .21 | .42 |
| B'C | 1 | 6 | .2 | .8 | .16 | .16 | .32 |

LOW POWER LOGIC MINIMIZATION FOR ELECTRICAL CIRCUITS

REFERENCE TO RELATED APPLICATIONS

The present application is related to the following U.S. patent application:

"Element Sizing For Integrated Circuits", invented by David T. Blaauw et al., Ser. No. 08/495,061, filed Jun. 26, 1995, and assigned to the assignee hereof.

FIELD OF THE INVENTION

The present invention relates generally to electrical circuit design and more particularly to the design and manufacture of logic circuitry which is optimized with regard to predetermined design criteria.

BACKGROUND OF THE INVENTION

With the continuing and increasing demand for electronic devices of all kinds, there is a concurrent need to improve the quality and reduce the manufacturing time of these devices. In general, all electronic devices include at least one integrated circuit ("IC") or "chip" which integrates millions of transistors and connections on one tiny substrate of semiconductor material. The miniaturization of integrated circuits, and the products which they control, continues to be of major significance in the marketplace and a driving force to the manufacturers of such products.

In designing integrated circuits, there are several key criteria which need to be optimized with respect to each other in order to create a design and an on-chip layout for an integrated circuit which provide the best overall results within certain cost and other design constraints. Such criteria include the size of the chip and the number of components contained thereon, power consumption of the chip and the speed of operation for the various functions accomplished within the chip. This kind of optimization analysis is normally done on a workstation or other computer system running various analysis and design programs which, in turn, operate to weigh the relative significance of the various design criteria for each specific application in which the designed integrated circuit will be implemented.

In the design of logic circuitry, the techniques currently in use can determine the combinations of gates circuits that will accomplish a given logic statement as a design goal. Normally, there are a number of design solutions which are effective to accomplish a certain goal and a designer is able to select one of many possible logic circuits for the application being designed. In the past, once a group of possible logic circuits has been identified, one of that group is arbitrarily selected and there have been no further constraints on that particular selection. While that approach is generally satisfactory, there is a need for an improved method for a more comprehensive approach to the optimization of elements in an integrated circuit design. More specifically, with the significance of circuit power consumption becoming more and more of a factor in the design of integrated circuits, it would be productive to consider the power impact of the group of acceptable logic circuits and select one of the group that would require the consumption of the least amount of power during normal operations.

BRIEF DESCRIPTION OF THE DRAWINGS

A better understanding of the present invention can be obtained when the following detailed description of the preferred embodiment is considered in conjunction with the following drawings, in which:

FIGS. 2A–2C represent a minimization process using a Karnaugh Map;

FIG. 3 is a table illustrating a probability process utilized in one embodiment of the present invention;

FIG. 4 is a Karnaugh Map including probability factors utilized with one implementation of the present invention;

FIG. 5 is a table illustrating one implementation of the probability feature of the present invention.

DESCRIPTION OF THE PREFERRED EMBODIMENT

The present invention provides an improved method and apparatus for use in selecting logic circuitry to be implemented in the design of integrated circuits, especially with regard to power optimization of the logic circuit combinations in an integrated circuit based on minimizing power requirements in situations where there is otherwise an arbitrary choice among several acceptable logic circuit combinations.

The power optimization method of the present invention takes a multi-phased approach toward power optimization. First, the choice of which logic circuits are acceptable to accomplish the desired logic function. The method then selects, from among the acceptable solutions, the particular combination which exhibits the best, i.e. the least, power usage requirement. According to the disclosed method, the power usage factor is determined as a function of the probability of a selected logic circuit switching between logic states.

When using Karnaugh Maps, and Quine-McCluskey and other techniques for minimizing logic circuits, certain logic terms, called prime implicants, are chosen to appear in the final minimized solution. A minterm is a "sum of the products" expression of a logical equation. A prime implicant is a minterm which has been "simplified" and is non-reducible i.e. none of the terms can be reduced any further through combinations with other terms in a logic expression. Therefore a prime implicant does not include any repetitive or unnecessary literals or conditions. Simplification of minterms leads directly to a realization of an implementing network using logical "AND" and "OR" gates. Often a situation arises where the choice between two or more prime implicants is arbitrary since different groups of prime implicants can accomplish the logic function desired. The present disclosure assigns a power consumption factor to the prime implicants thereby allowing an otherwise arbitrary decision to be decided in favor of the combination requiring the least power consumption.

Initially, as in the Quine-McCluskey method, all of the minterms of a logical function or expression are listed in binary form and separated into groups according to the number of logical "1"'s that occur in the binary representation. Next, an exhaustive search is performed for adjacent minterms, i.e. those that differ only by one bit position, and such terms are combined into lists. The prime implicants are then identified after combination, and a prime implicant chart is constructed. Unlike the Quine-McCluskey method, a power consumption factor is then assigned to each prime implicant. According to one embodiment, the power consumption factor is determined as a function of the switching probability of the prime implicants. Then, a minimum number of prime implicants that cover all of the minterms of the function is selected using the power consumption factor to bias any arbitrary decisions toward a low power solution.

Figure 1:
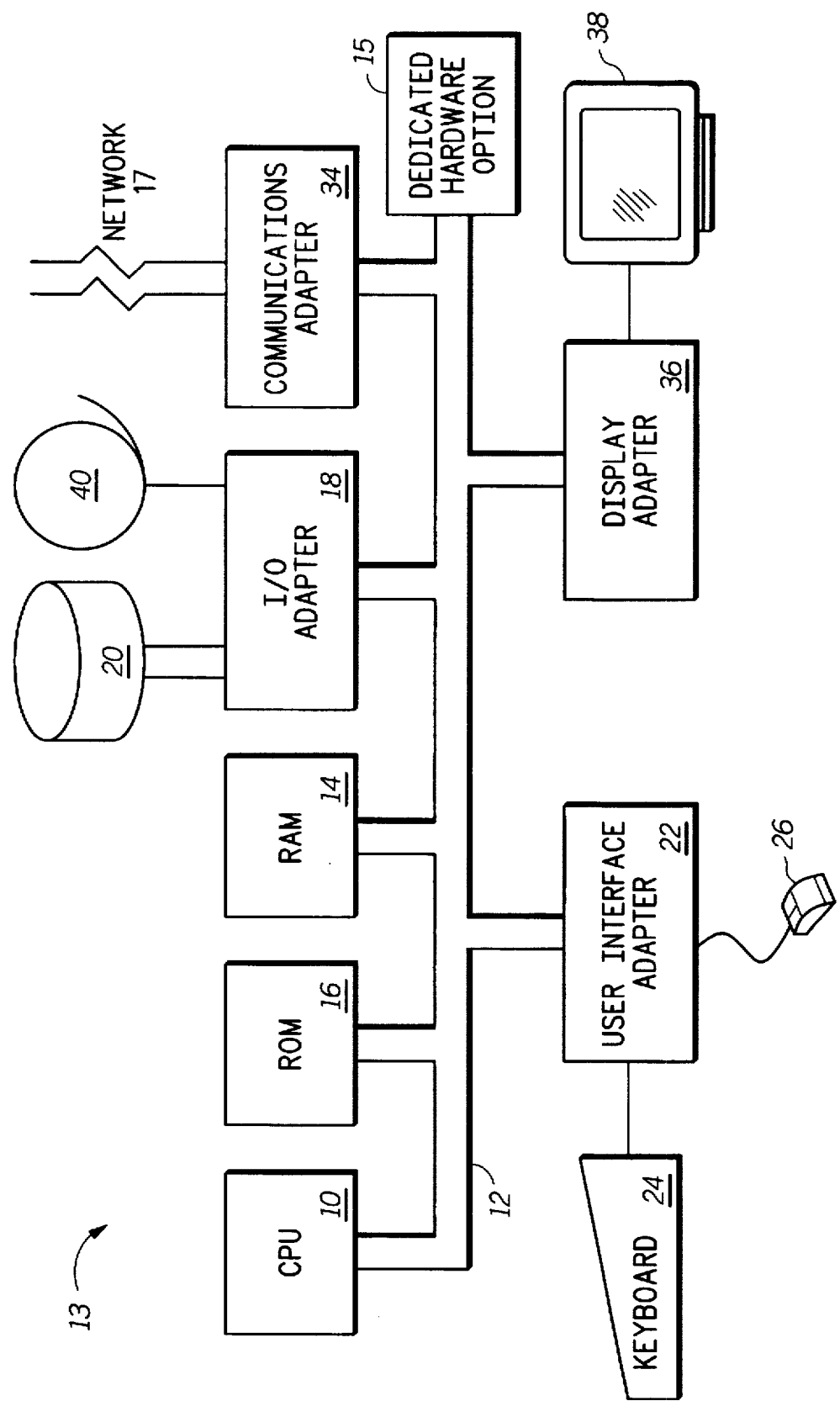
FIG. 1 is a block diagram of a system within which one embodiment of the present invention may be implemented.

The various methods discussed above may be implemented within dedicated hardware 15, or within processes implemented within a data processing system 13 as shown in FIG. 1. A typical hardware configuration of a workstation in accordance with the present invention is illustrated and includes a central processing unit (CPU)10, such as a conventional microprocessor, and a number of other units interconnected via system bus 12. The workstation shown in FIG. 1 includes random access memory (RAM) 14, read only memory (ROM) 16, and input/output (I/O) adapter 18 for connecting peripheral devices, such as disk units 20 and tape units 40, to bus 12. A user interface adapter 22 is used to connect a keyboard device 24 and a mouse 26 to the system bus 12. Other user interface devices such as a touch screen device (not shown) may also be coupled to the system bus 12 through the user interface adapter 22.

A communication adapter 34 is also shown for connecting the workstation to a data processing network 17. Further, a display adapter 36 connects the system bus 12 to a display device 38. The method of the present invention may be implemented and stored in one or more of the disk units 20, tape drives 40, ROM 16 and/or RAM 14, or even made available to system 13 via a network connection through communications adapter 34 and thereafter processed by CPU 10. Since the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In FIG. 2A, a Karnaugh Map form of a truth table for a function is presented showing three possible variables designated "A", "B" and "C". Each variable represents a condition which may either be true, i.e. at a logic "1" or "High" logic level, or false, i.e. at a logic "0" or "Low" logic level. In the Karnaugh Map, each block represents a different combination of the possible states of the variables listed. As shown, four possible combinations ("00", "01", "11" and "10") of variables "B" and "C" are listed on the left side of the a chart 200, and two states "0" and "1" of an "A" variable define adjacent vertical columns of the chart 200. The chart 200 includes four boxes or blocks 201, 203, 205 and 207 on the left side of the chart 200 under a logic "0" designation for variable "A", and four more blocks 209, 211, 213 and 215 juxtaposed thereto along the right side of the chart 200 under a logic "1" designation for variable "A". Taken together, the chart or map 200 includes blocks which represent all possible combination of logical states for three literals or variables "A", "B" and "C". In the present example, blocks 201, 203, 205 and 207 contain logical states for the function of "1", "1", "0" and "1", respectively. Also blocks 209, 213 and 215 all contain the logical state designation of "0". Block 211 contains an "X" designation which means that it does not matter whether it is a logic "1" or a logic "0". For example, block 211 may represent an unachievable or invalid input combination in the actual circuit represented.

In accordance with Karnaugh Map methods for determining prime implicants, terms associated with adjacent "1"'s in the Map or chart are listed in either minterm or maxterm form of the function. In the present example, a group 217 is analyzed in minterm form as shown in FIG. 2B. The first block which includes the logic "1" designation is block 201. The logic "1" means that since the "A" literal is in the "A=0" column, the value of "A" is zero or "A'" when writing an expression. Similarly, "B=0" and "C=0", such that the expression corresponding to block 201 is "F=A'B'C'". This is shown as the first term in the analysis 251 of blocks 201 and 203. The second term in the expression in the group 217 translates into a representation in which "A=0", i.e. "A" is in the logic 0 column, "B=0" and "C=1". Therefore, the expression is "F=A'B'C". That expression, when combined with the block 201 expression reduces to "F=A'B'" since the "C'" and the "C" terms cancel out.

In deriving a second term, the blocks 201 and 207, which also represent adjacent "1"'s, are taken together as shown at derivation 251. For block 201, "F=A'B'C'" as was previously shown, and for block 207, "F=A'BC'". When combined, those terms reduce to "F=A'C'" since the "B" and "B'" terms cancel. When that term is combined with the block 217 term, the result is the function "F=A'B'+A'C'". This expression means that the desired circuit or other condition "F" is true when condition or variable "A" is false and condition "B" is false, or when condition "A" is false and condition "C" is also false.

In the analysis of Karnaugh Maps, an "X" term, which stands for a "don't care" condition, may be taken as a "1" logic level for the purpose of grouping that term with another "1" block to formulate logic terms, as shown at derivation 253 in FIG. 2C, to implement the desired function. For example, if the "X" term in block 211 were taken as a "1", then blocks 211 and 203 would constitute adjacent "1" blocks eligible for expression derivation and combination. Accordingly, from block 211, "F=AB'C" and from block 203, "F=A'B'C", When combined, the "A" and the "A'" terms cancel and "F=B'C". Next, taking blocks 201 and 207 as adjacent "1" blocks, "F=A'BC'+A'B'C'" as discussed earlier. Those terms combine to "F=A'C'", and combining both terms, the result is "F=B'C+A'C'".

The expressions derived from the Karnaugh Map 200 represent two equations that are valid for implementing a desired condition "F". The two minimal, sum-of-products equations derived in FIG. 2B and FIG. 2C are possible valid expressions that would, when implemented with logic circuitry, realize the "F" function. In general, multiple and equally minimal logic expressions can be found to detect a desired logic condition and, in the past, one of those many solutions has been chosen arbitrarily for implementation in logic circuitry. In accordance with the present disclosure, another factor is added to optimize the selection process even more. Since the various logic circuit solutions each have, or could have, a different level of power consumption for the specific logic circuitry, as well as the overall power consumption of the integrated circuit being designed, it is deemed desirable to optimize the particular logic circuit and select the expression terms which, when implemented, would consume the least amount of power during the functioning of the logic circuitry. One measure of determining how much power will be consumed by any particular logic circuitry corresponding to a term in a logic expression, is to determine the number of times each term in an expression may switch states during a typical operation. Since each switching of logical states will consume power, the terms least likely to switch states will consume the least amount of power.

In FIG. 3, a table is presented which illustrates the methodology used in the present example to determine the probability that circuitry, corresponding to the valid terms of a logic expression, will switch states. From the derivations of FIG. 2B and 2C, three prime implicant logic terms have been precipitated after combination and isolated as being effective to implement the function being tested. Those prime implicant terms are "A'B'", "A'C'" and "B'C". Those terms are listed at the leftmost column in FIG. 3. The first term in the FIG. 3 chart is "A'C'". The number of valid input combinations that cause a term (e.g. A'C' for the first term) to be true, is listed in the "H" column 301. As shown, and with reference to FIG. 2A, the literal term "A" is "0" and the literal term "C" is also "0" at the same time, only two times i.e. in blocks 201 and 207. Accordingly, the number "2" is entered in the FIG. 3 chart in the "A'C'" row at the intersection with the "H" column 301. Similarly, the term "A'B'" is true twice (i.e. blocks 201 and 203) and a "2" is inserted in row "A'B'" at column "H". The term "B'C" is true only one time however (block 203) and so there is a "1" inserted on row "B'C" at column "h" 301.

The next column 303 in FIG. 3 shows the number of valid input combinations that a logic term is false (or LOW logic level "L"). As shown by the number "5" in the A'C' row, the term A'C' is FALSE in five blocks in the Karnaugh Map of FIG. 2A, i.e. all of the blocks other than 211 where A'C' is TRUE. Since there are eight total blocks in FIG. 2A, and in two of the blocks 201 and 207 A'C' is TRUE, in one of the blocks 211 it is undetermined, it remains that in the other five blocks, i.e. 209, 213, 215, 203 and 205, the condition A'C' is false. Accordingly, a "5" is inserted in the A'C' row at column "L" 303 in FIG. 3. Using a similar analysis, the term A'B' is LOW (i.e. "L" 303) in five blocks in FIG. 2A, and the term B'C is LOW 303 in six blocks. Accordingly there is a "5" in the A'B' row at column 303 and a "6" is inserted in the B'C row at column 303 in FIG. 3.

The next column 305 states the probability that each row term is in a HIGH logic level at any given time. That probability is equal to the number of times the term (A'C' or A'B' or B'C) is HIGH divided by the total number of possible chances. Since the "X" in FIG. 2A is not considered, there are only 7 possible chances or situation blocks being considered. Therefore, the number in column 305 will be the number in column 301 divided by "7" chances. Similarly, the number in the next column 307 represents the probability that the appearance of the term being considered is at a LOW logic level or that the term is false. Again the total number of chances in the Karnaugh Map or table is still seven total chances. Accordingly, the probability that the designated term is false is the number in column 303 divided by "7" total chances. Thus, for the terms "A'C'", "A'B'" and "B'C", the probability of being in the LOW state are "5/7", "5/7" and "6/7", respectively.

The next column 309 shows the probability for each term that the term will switch from the HIGH state "H" to the LOW state "L". That probability is determined by multiplying the probabilities of a term HIGH state in column 305 with the probability of a term LOW state in column 307. Similarly the probability that the particular terms will switch from the LOW state to the HIGH state is shown in the next column 311 and determined by again multiplying the LOW probability with the HIGH probability for each term. Finally, the probability that there will be a switching of any kind, either from the LOW state to the HIGH state or from the HIGH state to the LOW state, is shown in column 313 and determined by adding the respective HIGH to LOW and LOW to HIGH probabilities together.

Accordingly, the probability of switching for each term that is being considered is shown in column 313. Since any of the terms A'C', A'B' or B'C will satisfy the logic requirement and provide a signal representative that the literals in the terms are present in the indicated states, a designer may choose any of the terms shown to implement the underlying truth table of conditions. However, as discussed above, in order to optimize that choice in line with minimal power consumption, the probability of each of the terms switching states is also considered as one indicium of power consumption. Accordingly, when factored into the method, the probability of switching in column in 313 indicates that the term "B'C" is least likely to switch and still provide the required circuit logic function. Therefore, the term "B'C", having the smallest switching probability of 12/49, should be chosen in order to optimize the power consumption of the selected logic term and corresponding implementing logic circuitry.

In the analysis shown in FIGS. 2A–2C and FIG. 3, it was assumed that all of the terms had equal probabilities of occurring in the combinations shown. However, in particular situations the probabilities of the occurrences of the various combinations may be different and that scenario is considered in connection with FIG. 4 and FIG. 5. In FIG. 4, the Karnaugh Map 401 illustrated is the same as that shown in FIG. 2A except that probabilities of occurrences of the various combinations of literals is shown in parenthesis. In FIG. 4, blocks 401, 403, 405 and 407 represent the conditions of the B and C literals when the A literal is in a logic "0" state. Similarly, blocks 411, 413, 415 and 417 show the condition of the B and C literals when the A literal is at a HIGH or "1" logic state. The analysis of blocks in FIG. 4 corresponds to the analysis discussed in connection with FIG. 2A and yields expressions 421 and 423 identical to those derived in FIG. 2B and FIG. 2C.

As can be seen with reference to FIG. 4, the condition in which A=0, B=0 and C=0 is represented by block 401 of the Karnaugh Map and the probability of the occurrence of that combination at any given time is given as "0.1", i.e. that condition of A and B and C will be present 10% of the time. Similarly, The probability of the block 403 condition existing (i.e. A=0, B=0, C=1) is "0.2". As further shown, the probabilities for the conditions or terms represented by blocks 405, 407, 411, 413, 415 and 417 are 0.1, 0.2, 0.1, 0, 0.2 and 0.1, respectively. The probability associated with block 413 is "0" since that block represents, for example, a situation that will never occur.

With reference to FIG. 5, the methodology for determining the probability of switching for the various circuits represented by the terms of the derived expression is disclosed. As hereinbefore noted, in the present example, that probability is taken as a measure of power consumption for the circuits corresponding to the various terms, and is used in optimizing the design selection of the implementing logic circuitry for a particular function with respect to the power consumption of that circuitry. In FIG. 5 the terms being analyzed i.e. A'C', A'B' and B'C, are set forth at the leftmost column of the illustrated chart. With reference to the term A'C' in the FIG. 4 table, it is noted that the literals A and C will both be "0" at the same time in blocks 401 and 407. Therefore the number of High states "H" for the term A'C' is "2". That situation is represented in FIG. 5 in column 501 in the A'C' row. Similarly, the terms A'B' and B'C appear to be high in 2 (401 and 403) and 1 (403) blocks, respectively as designated in FIG. 5 row 501, columns A'B' and B'C, respectively. The three terms being analyzed in the present example are at a low state "L", as shown in column 503. A'C' is Low in five blocks 403, 405, 411, 415 and 417, and that is designated by the number "5" in column 503 row A'C'. Similarly, A'B' and B'C are in an "L" state in five and six blocks, respectively, as shown in column 503.

In column 505, the probability that the term A'C' will be in a "High" state at any given time is determined by adding the given time probabilities for the two blocks in which the term is "1". For example, the term A'C' is at a "1" level in blocks 401 and 407 in FIG. 4. The probability associated with block 401 is "0.1" and the probability given for the block 407 is "0.2". Adding those probabilities together gives a "0.3" probability that the term A'C' will be present at any given time. Accordingly, a "0.3" is inserted in the FIG. 5 chart in column 505 in the A'C' row. In similar fashion, the "High" probabilities for the terms A'B' and B'C are shown in their respective designated rows in FIG. 5. In like manner, the probabilities that the terms A'C', A'B' and B'C will be in a "Low" state is determined by adding the given probabilities in the corresponding blocks in FIG. 4 and inserting those probabilities in the "P(L)" column 507 of FIG. 5. For example, A'C' will be Low in blocks 403, 405, 411, 415 and 417. The respective probabilities given for those blocks are "0.2", "0.1", "0.1", "0.2" and "0.1". Adding those probabilities together gives a total of "0.7" which is shown in the P(L) column 507 in the A'C' row.

The probability values represented in the next two columns 509 and 511 in FIG. 5 are determined by multiplying the probabilities in columns 505 and 507. For example, in obtaining the probability of A'C' switching from a High state 505 to a Low state 507 is "0.21" which is shown in column 509. In the present example, the probability of A'C' switching from a Low state 507 to a High state 505 is also "0.21" which is shown in column 511. The total probability of switching in either direction is shown in the "PS" column 513 and is determined by adding the probability of switching from High to Low in column 509 and the probability of switching from Low to High in column 511 for each of the prime implicants being analyzed.

In the application of the "PS" factors derived as shown in FIG. 5, the logic function desired is determined to be implementable by any of the logic circuits represented by the prime implicant terms A'C', A'B' or B'C. Normally any of the three circuits may be selected to perform the desired function, and one is usually chosen on an arbitrary basis. However, as disclosed herein, by analyzing each of the possible prime implicants with respect to its power consumption characteristic, an implementing circuit may be selected to minimize the power required by each logic circuit used in an integrated circuit thereby minimizing the power consumed by the logic portion of integrated circuits. In the present example, the prime term B'C would be selected since the probability of switching for that term is the least ("0.32") of the three terms considered. Therefore the B'C term will most likely switch states least frequently and thereby consume the least amount of power in carrying out its function in the integrated circuit.

Figure 6:
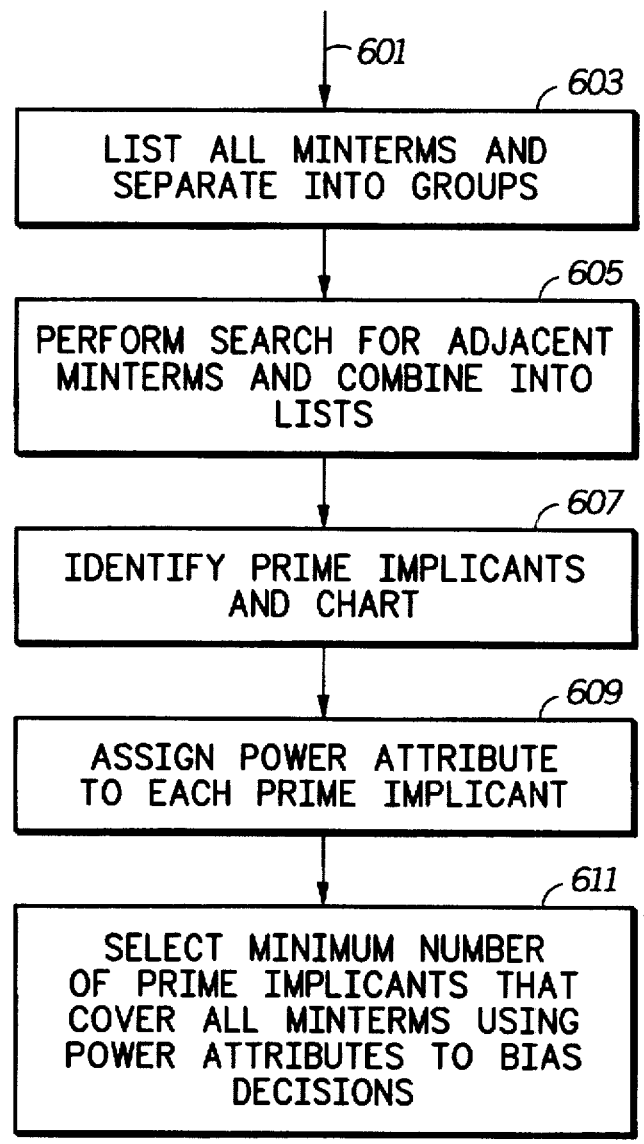
FIG. 6 is a flow diagram illustrating one implementation of the method of the present invention.

In FIG. 6, An overall flow diagram is shown illustrating one exemplary method implemented in accordance with the present invention. The implementing flow section may be called from another program function 601 or be initiated as a separate stand-alone program. Initially, all of the minterms for a logic function or expression are listed 603 and separated into groups as shown in FIG. 2. Next, a search is initiated for adjacent minterms 605 which are then combined into lists. This was illustrated in FIG. 2A group 217. Next, the prime implicants are determined 607 and charted. That operation was illustrated in FIG. 2B and FIG. 2C and FIG. 3, for example. A power attribute is then determined and assigned 609 to each prime implicant being considered. Then, a minimum number of prime implicants is selected using the determined power attribute for each prime implicant term to bias the selection 611.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art. In addition, the present invention may be used to minimize the logic circuitry required by any type of electrical circuit, not just integrated circuits. Accordingly, the present invention is not intended to be limited to the specific form set forth herein, but on the contrary, it is intended to cover such alternatives, modifications, and equivalents, as can be reasonably included within the spirit and scope of the invention.

We claim:

1. A method for prioritizing each circuit solution of a group of valid circuit solutions effective to implement a given logic function, said method comprising the steps of:

identifying a plurality of prime implicant terms, said prime implicant terms corresponding to said valid circuit solutions, each of said prime implicant terms being effective to implement said given logic function;

determining a power consumption factor representative of the power requirements for each circuit solution of said group, said step of determining a power consumption factor further including a calculation of a probability of switching logic states for each of said prime implicant terms; and prioritizing said group of valid circuit solutions in accordance with said determined power consumption factor.

2. The method as set forth in claim 1 wherein said calculation includes the steps of:

determining for each of said prime implicants, a first probability that said each prime implicant is in a first logic state;

determining for each of said prime implicants, a second probability that said each prime implicant is in a second logic state; and multiplying, for each of said prime implicants, said first probability and said second probability.

3. The method as set forth in claim 1 wherein said given logic function is expressed as a plurality of minterms in a Karnaugh Map, said step of identifying further includes the steps of:

performing a search for adjacent minterms;

grouping said adjacent minterms;

deriving logical terms from said grouped minterms; and combining said logical terms to eliminate non-material literals in each of said terms, said combining thereby providing said given logic function.

4. The method as set forth in claim 1 wherein said probability of switching logic states is based upon a probability of said prime implicant terms switching from a first logic state to a second logic state.

5. The method as set forth in claim 4 wherein said first logic state is a high logic level and said second logic state is a low logic level.

6. The method as set forth in claim 4 wherein said probability of switching logic states is also based upon a probability of said prime implicant terms switching from said second logic state to said first logic state.

7. The method as set forth in claim 1 wherein said method is implemented in selecting one of said group of valid circuit solutions, said method, after said step of prioritizing, further includes a step of selecting one of said group of valid circuit solutions, said one being most likely to consume a minimal amount of power.

8. The method as set forth in claim 1 and further including a step of identifying a plurality of prime implicant terms, said prime implicant terms corresponding to said circuit solutions, each of said prime implicant terms being effective to implement said given logic function, said step of determining a power consumption factor further including a calculation of a probability of switching logic states for each of said prime implicant terms.

9. The method as set forth in claim 8 wherein said given logic function is expressed as a plurality of minterms in a Karnaugh Map, said step of identifying further includes the steps of:

performing a search for adjacent minterms;

grouping said adjacent minterms;

deriving logical terms from said grouped minterms; and combining said logical terms to eliminate non-material literals in each of said terms, said combining thereby providing said given logic function.

10. The method as set forth in claim 8 wherein said probability of switching logic states is based upon a probability of said prime implicant terms switching from a first logic state to a second logic state.

11. The method as set forth in claim 10 wherein said first logic state is a high logic level and said second logic state is a low logic level.

12. The method as set forth in claim 10 wherein said first logic state is a low logic level and said second logic state is a high logic level.

13. The method as set forth in claim 8 wherein said calculation includes the steps of:

determining for each of said prime implicants, a first probability that said each prime implicant is in a first logic state;

determining for each of said prime implicants, a second probability that said each prime implicant is in a second logic state; and multiplying, for each of said prime implicants, said first probability and said second probability.

14. In a system having a storage medium including machine readable indicia, said storage medium being selectively coupled to a reading device, said reading device being coupled to processing circuitry, said reading device being selectively operable to read said machine readable indicia and provide program signals representative thereof, a method for prioritizing each circuit solution of a group of valid circuit solutions, the group of valid circuit solutions effective to implement a given logic function, the method comprising the steps of:

identifying a plurality of prime implicant terms, said prime implicant terms corresponding to said valid circuit solutions, each of said prime implicant terms being effective to implement said given logic function;

determining a power consumption factor representative of the power requirements for each circuit solution of said group, said step of determining a power consumption factor further including a calculation of a probability of switching logic states for each of said prime implicant terms; and prioritizing said group of valid circuit solutions in accordance with said determined power consumption factor, the prioritizing being performed by said processing circuitry in response to said program signals.

15. The method as set forth in claim 14, further comprising the step of:

selecting one of said group of valid circuit solutions after prioritizing said group of valid circuit solutions in accordance with said determined power consumption factor, said one group of valid circuit solutions being most likely to consume a minimal amount of power.

* * * * *